(12) United States Patent
Sirstins et al.

(10) Patent No.: US 8,793,581 B2
(45) Date of Patent: *Jul. 29, 2014

(54) SYSTEM FOR PRESENTING SCRIPTS TO A CONTACT

(71) Applicant: Noguar, L.C., Murray, UT (US)

(72) Inventors: John Sirstins, Salt Lake City, UT (US);
Jennifer Smith, Waterford, VT (US);
Forest Baker, III, Salt Lake City, UT (US);
Forest Baker, IV, Murray, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,236

(22) Filed: May 3, 2013

(65) Prior Publication Data

US 2013/0243181 A1 Sep. 19, 2013

Related U.S. Application Data

(60) Continuation of application No. 12/648,171, filed on Dec. 28, 2009, now Pat. No. 8,438,494, which is a division of application No. 11/092,120, filed on Mar. 28, 2005, now Pat. No. 7,640,510, and a continuation of application No. 09/920,072, filed on Aug. 1, 2001, now Pat. No. 7,933,387.

(60) Provisional application No. 60/556,821, filed on Mar. 27, 2004, provisional application No. 60/225,623, filed on Aug. 15, 2000.

(51) Int. Cl.
*G06F 15/00* (2006.01)
*G06F 13/00* (2006.01)
*H04M 3/50* (2006.01)
*H04M 3/527* (2006.01)

(52) U.S. Cl.
CPC ............... *H04M 3/50* (2013.01); *H04M 3/527* (2013.01)
USPC ........................................... 715/716; 715/765

(58) Field of Classification Search
CPC .............................. H04M 3/50; H04M 3/527
USPC ......... 715/763–765, 853–854, 780, 740–741, 715/700
See application file for complete search history.

(56) References Cited

U.S. PATENT DOCUMENTS

| 4,567,359 A | 1/1986 | Lockwood |
| 4,697,282 A | 9/1987 | Winter et al. |
| 5,146,562 A | 9/1992 | Kukla |

(Continued)

OTHER PUBLICATIONS

Elahee, MD S. "Final Office Action", U.S. Appl. No. 09/920,072, (Dec. 19, 2008),18.

(Continued)

*Primary Examiner* — Kevin Nguyen
(74) *Attorney, Agent, or Firm* — David Fonda

(57) ABSTRACT

A system is disclosed for presenting a plurality of scripts to a contact. A system includes a dialer, controller, Input/Output devices, and a memory containing modules for execution on a processor. A script player module plays a plurality of prerecorded audio file scripts. A presentation module presenting a plurality of script options to an agent. An input module receives an agent input corresponding to at least one of the script options. A profile module stores a contact profile reflecting contact-specific data, and the presentation module presents script options to the agent based upon the profile for outputting contact-specific scripts.

3 Claims, 9 Drawing Sheets

(56) References Cited

U.S. PATENT DOCUMENTS

| | | |
|---|---|---|
| 5,251,251 A | 10/1993 | Barber et al. |
| 5,430,792 A | 7/1995 | Jesurum et al. |
| 5,544,230 A | 8/1996 | Megyesi |
| 5,652,789 A | 7/1997 | Miner et al. |
| 5,724,420 A | 3/1998 | Torgrim |
| 5,729,593 A | 3/1998 | Baker et al. |
| 5,787,151 A | 7/1998 | Nakatsu et al. |
| 5,819,029 A | 10/1998 | Edwards et al. |
| 5,828,731 A | 10/1998 | Szlam et al. |
| 5,913,195 A | 6/1999 | Weeren et al. |
| 5,940,497 A | 8/1999 | Miloslavsky |
| 5,946,386 A | 8/1999 | Rogers et al. |
| 5,995,614 A | 11/1999 | Miloslavsky |
| 6,002,760 A | 12/1999 | Gisby |
| 6,009,149 A | 12/1999 | Langsenkamp |
| 6,038,544 A | 3/2000 | Machin et al. |
| 6,041,116 A | 3/2000 | Meyers |
| 6,047,060 A | 4/2000 | Fedorov et al. |
| 6,055,513 A | 4/2000 | Katz et al. |
| 6,216,111 B1 | 4/2001 | Walker et al. |
| 6,356,634 B1 | 3/2002 | Noble, Jr. |
| 6,459,774 B1 | 10/2002 | Ball et al. |
| 6,587,557 B1 | 7/2003 | Smith |
| 6,853,713 B1 | 2/2005 | Fobert et al. |
| 6,965,870 B1 | 11/2005 | Petras et al. |
| 2002/0138295 A1 | 9/2002 | Ekrem |
| 2003/0023952 A1 | 1/2003 | Harmon, Jr. |
| 2003/0171925 A1* | 9/2003 | Werner ...................... 704/270.1 |
| 2003/0202649 A1 | 10/2003 | Haug, Jr. et al. |
| 2005/0091059 A1* | 4/2005 | Lecoeuche ................. 704/270.1 |

OTHER PUBLICATIONS

Elahee, MD S. "Notice of Allowance", U.S. Appl. No. 09/920,072, (Feb. 26, 2010 2008),6.

Elahee, MD S. "Non-Final Office Action", U.S. Appl. No. 09/920,072, (Mar. 7, 2008),13.

Elahee, MD S. "Non-Final Office Action", U.S. Appl. No. 09/920,072, (Sep. 3, 2009),11.

Elahee, MD S. "Non-Final Office Action", U.S. Appl. No. 09/920,072, (Jul. 31, 2008),11.

Hoosain, Allan, "Non-Final Office Action", U.S. Appl. No. 09/920,072, (Dec. 5, 2005),13.

Hoosain, Allan, "Non-Final Office Action", U.S. Appl. No. 09/920,072, (Jun. 30, 2005),11.

Hoosain, Allan, "Non-Final Office Action", U.S. Appl. No. 09/920,072, (Jul. 19, 2004),10.

Nguyen, Cao H., "Non-Final Office Action", U.S. Appl. No. 12/648,171, (Jul. 31, 2012), 9.

Nguyen, Cao H., "Notice of Allowance", U.S. Appl. No. 12/648,171, (Jan. 16, 2013), 5.

Nguyen, Cao H., "Final Office Action", U.S. Appl. No. 11/092,120, (Mar. 10, 2009), 9.

Nguyen, Cao H., "Non-Final Office Action", U.S. Appl. No. 11/092,120, (Jul. 25, 2008), 7.

Nguyen, Cao H., "Notice of Allowance", U.S. Appl. No. 11/092,120, (Sep. 3, 2009), 12.

King, Simon, "Final Office Action", U.S. Appl. No. 13/093,796, (Mar. 26, 2013), 5.

King, Simon, "Non-Final Office Action", U.S. Appl. No. 13/093,796, (Oct. 26, 2012), 6.

King, Simon, "Notice of Allowance", U.S. Appl. No. 13/093,796, (May 31, 2013), 9.

* cited by examiner

SYSTEM FOR PRESENTING SCRIPTS TO A CONTACT

CROSS-REFERENCES TO RELATED APPLICATIONS

This application is a continuation of and claims priority to U.S. patent application Ser. No. 12/648,171, filed Dec. 28, 2009, which issued as U.S. Pat. No. 8,438,494 and which is a divisional application of and claims priority to U.S. patent application Ser. No. 11/092,120, filed Mar. 28, 2005, which issued as U.S. Pat. No. 7,640,510. U.S. patent application Ser. No. 11/092,120 claims priority to U.S. Provisional Patent Application No. 60/556,821, filed on Mar. 27, 2004 and was also a continuation of, and claims priority to, U.S. patent application Ser. No. 09/920,072, filed Aug. 1, 2001, which issued as U.S. Pat. No. 7,933,387. U.S. patent application Ser. No. 09/920,072 claims the benefit of U.S. Provisional Patent Application No. 60/225,623, filed Aug. 15, 2000. These applications and patents are incorporated by reference.

BACKGROUND OF THE INVENTION

1. Field of the Invention

The present invention relates generally to a calling apparatus, system, and method for contacting potential customers or other contacts. More particularly, the present invention relates to a calling apparatus, system, and method for efficiently presenting scripted dialog that is personal to the contact.

2. Description of the Related Art

In the sales business, telephone marketing is essential. Simply put, the more potential customers you contact, the more potential sales you will have. Telephone marketing companies employ sales representatives to call potential customers and provide a sales pitch. These companies often employ hundreds of sales representatives or agents to work out of large calling centers. Most calling centers are equipped with phone technology that allows the sales representative to make or initiate a large volume of phone calls to contacts in a short period of time. Although market research may determine the best information to present to a particular type of customer contact, different agents present the material in different ways, and the way in which the agent communicates with a potential customer or contact is often the difference between a sale and a rejection. To that end, professional voice actors may be employed to deliver scripted information and content to contacts and potential customers. Voice actors record scripts to be played by multiple sales agents. These scripts may be utilized as part of a calling system for contacting the potential customer.

The problem with many existing calling systems however, is that they are inflexible in responding to a customer. Playing prerecorded scripts to respond to a live, presently asked, question is inadequate. Prerecorded scripts do not understand context or provide information to allow the agent to respond without having a contact know they are talking with a computer. Few, if any, existing calling systems allow an agent to seamlessly interject into the dialog to respond to a concern by the contact. Instead, the predetermined scripted sales dialog continues without addressing the contact's real-time questions or responses. Most people, even if interested in the product being offered, are turned off by the fact that they are not talking to a live person. Customers can become frustrated when a calling system plays a script that does not precisely match or correspond to a response or question by the contact. When a potential customer determines that they are having a dialog with a computer, they often hang up and the potential sale is lost.

Presently known calling systems that play prerecorded scripts, either do not allow for interjection by a human voice, or do not allow the transparent switch from computer to human voice without a difference in sound or quality that is obvious to the contact. Further, existing calling systems do not allow the seamless transition in content between a live voice and a prerecorded script. Additionally, the flow of dialog in existing calling systems is slow and stilted with an unnatural or mechanical pace or feel to it.

Further, most existing calling systems do not keep track of data presented by the system and received by the contact for future statistical, accounting or other uses. Nor can these systems provide personalized scripts to the contact.

Thus, it would be an advancement in the art to provide a calling apparatus, system, and method for contacting a customer that is flexible and natural in the way content is presented to a customer. It would be an additional advancement in the art to provide such an apparatus, system, and method that could be used with outgoing calls. It would be another advancement if a variety of prerecorded content could be provided and easily negotiated by a sales agent. It would be an additional advancement in the art to provide an apparatus, system, and method that could keep track of important calling and contact data. It would be yet an additional advancement in the art to provide such an apparatus, system, and method for seamlessly and transparently integrating an agent=s live voice with a prerecorded voice by someone other than the agent. It would be another advancement to provide such an apparatus, system, and method that was easy to utilize and navigate between scripts to form a dialog that was not disjointed.

Such an apparatus, system, and method in accordance with the present invention are disclosed and claimed herein.

SUMMARY OF THE INVENTION

The present invention has been developed in response to the present state of the art, and in particular, in response to the problems and needs in the art that have not yet been fully solved by currently available apparatuses, systems, and methods for presenting scripts to contacts. Accordingly, the present invention has been developed to provide an apparatus, system, and method that overcome many or all of the above-discussed shortcomings in the art.

The apparatus for presenting a plurality of scripts to a contact is provided with a logic unit containing a plurality of modules configured to functionally execute the necessary steps of presenting options to play scripts to an agent and receiving inputs from the agent to effectuate the playing of the scripts. These modules in the described embodiments include a script player module for playing a plurality of scripts, a presentation module for presenting a plurality of script options to an agent, an input module for receiving an agent input corresponding to at least one of said plurality of script options. At least one agent input corresponds to an executable file for playing a script. A profile module, for storing a contact profile reflects script options having contact-specific data.

An apparatus for formulating scripts is also disclosed. In one embodiment, an apparatus for formulating a computerized presentation of a sequence of scripts comprising audio files includes a content module for providing scripts having predetermined content, an interaction module for allowing agents to present the scripts to a contact and to freely interject agent content into the script presentation, a recording module for recording the presentation of scripts and agent interjections, a structure module for providing a profile structure based upon the presentation of scripts and agent interjections, and an output module for outputting a dynamic script structure comprising a sequence and content of information to be presented in the scripts.

A system of the present invention is also presented to dispose of calls. The system may be embodied in computer telephony interface system. In particular, the system, in one embodiment, includes a dialer that can connect to phone system. A controller may be coupled to the dialer for managing dialing functions. In one embodiment, Input/Output (I/O) devices are configured to interact with an agent. The agent may use the I/O devices to interact with a call by playing scripts on a script player. A memory containing modules for execution on a processor may also be provided. The modules may include those described above. A communication network may couple the dialer, controller, processor, I/O devices, and memory.

A method of the present invention is also disclosed for presenting a plurality of audio files to a contact. The method in the disclosed embodiments substantially includes the steps necessary to carry out the functions presented above with respect to the operation of the described apparatuses and system. In one embodiment, the method includes storing a plurality of audio files and presenting to an agent a selection of script options corresponding to the audio file. The method may include receiving from an agent an input to control playing of an audio file to the contact. In one embodiment, the method includes storing a profile reflecting data corresponding to the response of the contact. The method may also include selectively playing a plurality of audio files, customized to reflect the profile.

A method for formulating a computerized presentation of a sequence of scripts is also disclosed. In one embodiment, the method includes providing scripts having fixed or user-defined content to an agent controlling the presentation of the scripts. The agent may be allowed to interject into the presentation of the scripts with agent content. In one embodiment, the method includes observing the agent during presentation to prospective customers and recording the execution of the script segments and interjection of agent content as presented at the discretion of the agent. A profiling structure based upon sequencing and content of the pre-determined or fixed content, customer-dependent content and ad lib or agent content may be provided along with a dynamic script structure comprising a sequence and content of information to be presented in script segments.

Embodiments of a computer-readable medium are also disclosed. The computer-readable mediums may include instructions to carry out operations to perform the functions of the apparatuses described above and the method steps described above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
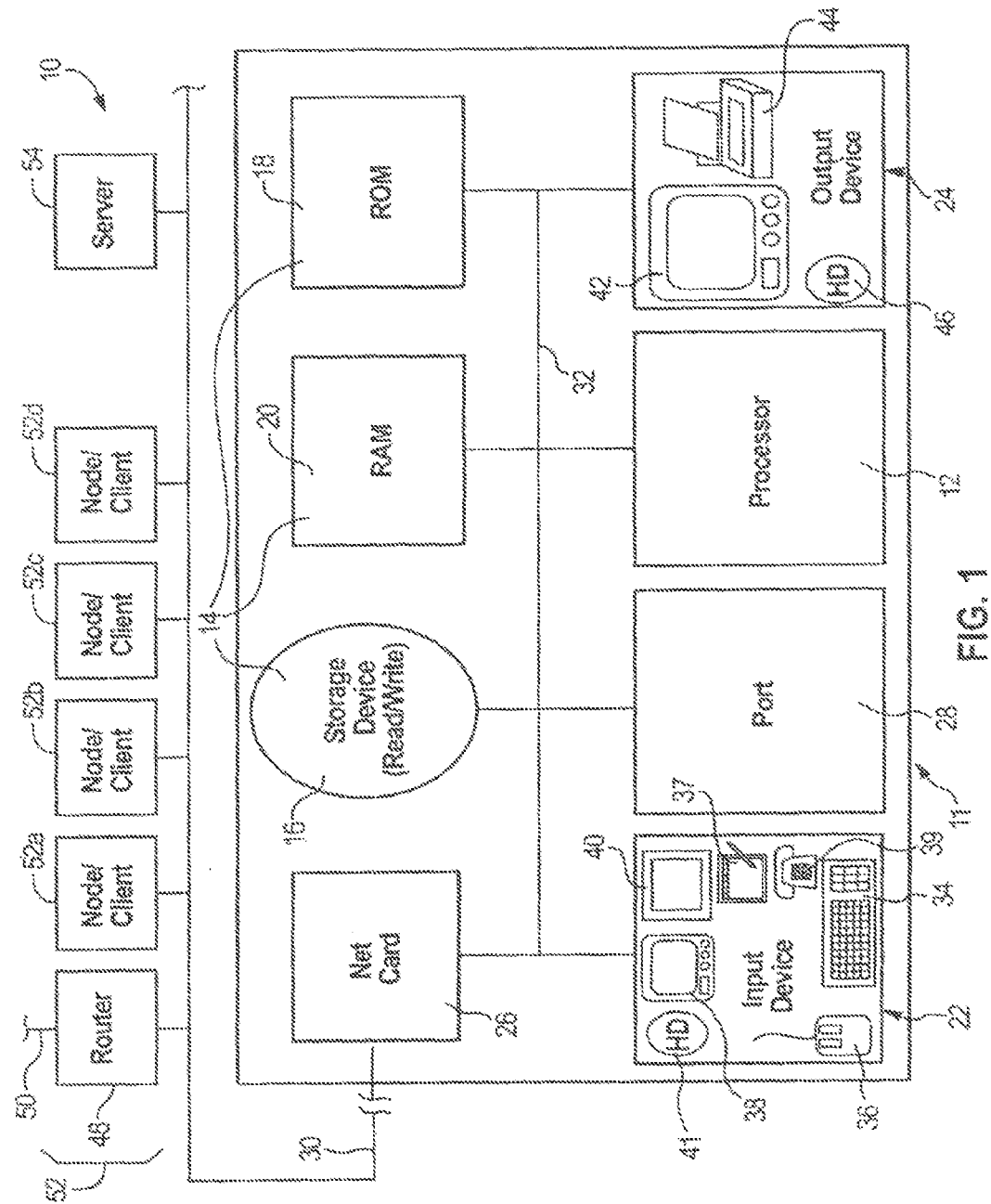
FIG. 1 is a schematic block diagram illustrating one embodiment of a script presentation system according to the present invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. Executable files, executables, and/or an identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, an executable file or module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal-bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, a call disposition system 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs, which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

Figure 2:
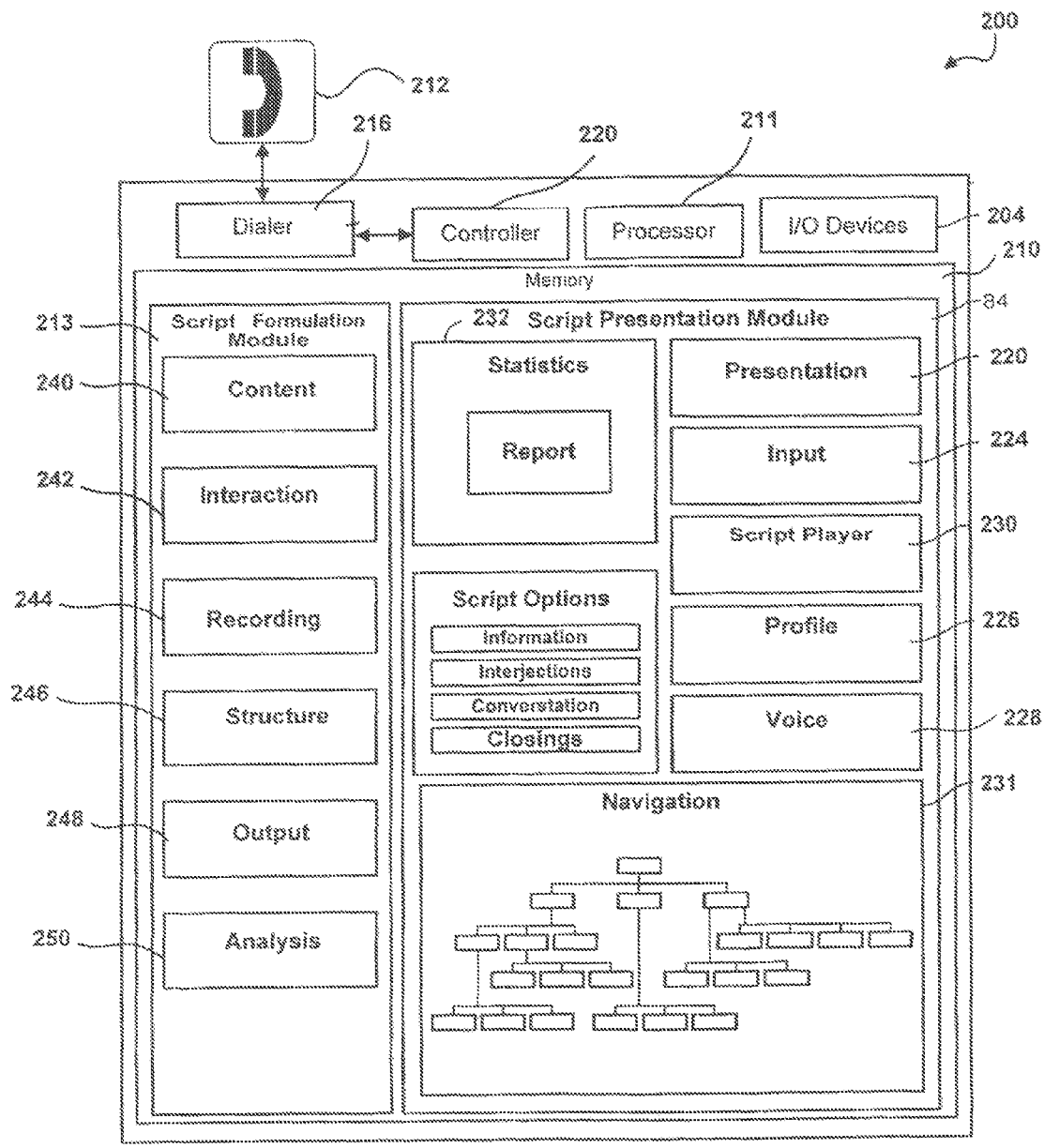
FIG. 2 is a schematic block diagram illustrating another embodiment of a script presentation system according to the present invention.

FIG. 2 illustrates another embodiment of a call disposition system 200 in accordance with the present invention. The system may include the features and operational aspects of FIG. 1. The system may also include a dialer 216 configured to connect to and utilize a phone system 212. The dialer 216 may be programmed to call a phone number corresponding to a contact. The dialer 216 may allow the agent to initiate the call manually or through the system 200. Additionally, the system 200 may automatically initiate the call.

In one embodiment, the connection is a T-1 line. In other embodiments, the connection may be through the Internet, broadband lines, cable lines, and the like. A controller 220 may be coupled to the dialer 216. The controller 220 may manage the dialer 216 and facilitate use of the phone system by the call disposition system 200.

The system 200 may include Input/Output (I/O) devices 204 configured to interact with a user or agent. As used herein throughout, "user" and "agent" may be used interchangeably. As stated above, I/O devices may include without limitation, a keyboard, a monitor, a mouse, a touch screen, a headset, a microphone, speakers, printers, scanners, and the like. The I/O devices 204 allow an agent to interact with a call initiated by the dialer 216. In one embodiment, the agent interacts with the call, or contact to whom the call was placed, by playing prerecorded scripts on a script player 230. The script player 230 may include hardware, firmware, data structures, and/or software in the form of a script player module 230. The scripts may be in the form of audio files. As used herein, a script can be a single audio file containing words, sounds, or a mixture thereof. As script can also be a collection of script segments that together make up a presentation. Thus, script, script segment, and script file are used interchangeably.

In one embodiment, the script player 230 plays audio files automatically or in response to an input from the agent. The script player may access memory 210 in the calling system 200 to obtain the audio files stored there. It may play the audio file over the phone system 212 to the contact. The script player 230 may be programmed to sequence various audio files, stop the playing of the audio files, and start the playing of the audio files.

The system 200 may also include a memory 210 containing modules for execution on a processor 211. In one embodiment, the system 200 includes a script formulation module 213 and a script presentation module 215. As will be discussed in greater detail below, these modules may take the form of separate apparatuses.

The script presentation module or apparatus 215 may contain a presentation module 220 for presenting a plurality of script options to an agent. The presentation module 215 also includes an input module 224 for receiving agent inputs. Each input corresponds to a script option. The input may launch executables programmed to carry out a variety of commands, including but not limited to, playing a script, executing a hang up sequence, executing a call transfer sequence, updating a database, storing a response, outputting data or a report, and the like.

The presentation module 215 includes a profile module 226 for storing contact-specific data. This data may include without limitation, marital status, number of children, family relationships, business relationships, titles, customer technology, attitudes, dispositions, prior affirmations, socioeconomic factors, purchasing patterns, and the like.

In one embodiment, the system 200 includes a voice module 228 to allow an agent to switch off, pause, or otherwise stop playing scripts and use live voice. This may be necessary when a contact gives a response for which there is no appropriate comeback script. The voice module 228 and input module 224 allow an agent to selectively and seamlessly interleave voice and system-played scripts.

A navigation module 231 allows an agent to view script options corresponding to a previously played script. The navigation module 231 may also allow the agent to switch from a present set of script options to a different set of script options. In one embodiment, the presentation module 220 present navigation options to accomplish maneuvering between different script options or to backtrack or relocate to different part of the overall sequence of scripts. The presentation module 215 of the system 200 may also include a statistics module 232 for keeping statistical data regarding agent inputs.

The system 200 also includes a script formulation module 213 to formulate scripts. This module 213 may also be a stand-alone apparatus. Scripts may include without limitation, any word, phrase, sentence, laughter, coughs, noises, banter other conversational elements or combinations thereof. Scripts may also include a sequence of smaller scripts or segments of a larger script.

The script formulation module 213 contains a content module 240 for providing scripts having predetermined content. The script formulation module 213 also includes an interaction module 242 that allows agents to present the scripts to a contact and to freely interject agent content into the script presentation. The agent may interject by executing predetermined conversational or ad-lib script files. The interaction module 242 also allows the agent to interject and interact in live voice with a contact. The script formulation module 213 also includes a recording module 244 for recording the presentation of scripts by the agent and the agent's interjections. A structure module 246 provides a profile structure based upon the presentation of scripts and agent interjections. The structure may include classes of information that are contact-specific and that could be identified and used later in the playing of scripts.

The script formulation module 213 includes an output module 248 for outputting a dynamic script structure comprising a script segment sequence and script segment content. The script formulation module 213 may also include an analysis module 250 to determine the frequency and sequence of script segments presented by the agent to a contact to modify the content and sequence of script segments to be presented by the agent.

A communication network (not shown) couples the dialer 216, controller 220, processor 211, I/O devices 204, and memory 210. The communication network may be any of a number of suitable communication networks known in the art, including, but not limited to a storage area network, (SAN), local area network (LAN), wide area network (WAN), the Internet, a direct connection via a point to point or multi-drop buss connection, for example, a Small Computer Storage Interface (SCSI) interface, and the like.

Figure 3:
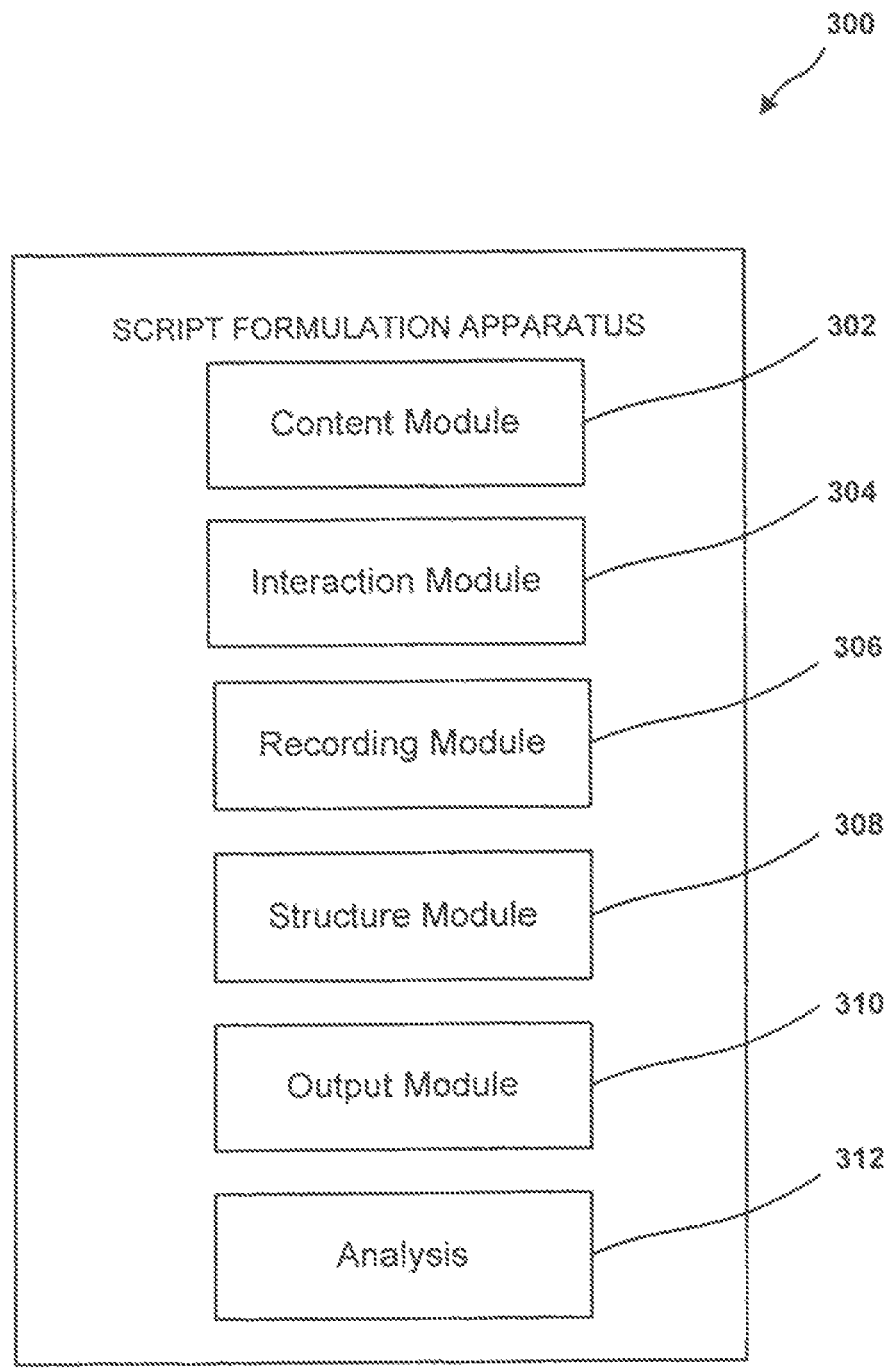
FIG. 3 is a schematic block diagram illustrating one embodiment of a script formulation apparatus capable of operation in the system of FIG. 2.

FIG. 3 depicts script formulation apparatus 300. As discussed above in conjunction with the system, the script formulation apparatus can be part of the system or a stand-alone apparatus. In either configuration, the script formulation apparatus 300 or module 213 functions substantially the same way to formulate a computerized presentation of a sequence of scripts comprising audio files. The script formulation apparatus 300 contains a content module 302 for providing scripts having predetermined content. These scripts may be a user survey, a marketing campaign, information regarding a product, and the like. These scripts may be designed to establish a relationship with the contact, draw out information, present information, precipitate a decision, prompt an action, and/or close a sale. However, scripts alone, without proper use, may not accomplish a user's objectives. The content module 302 provides an agent with a basic script. The script formulation module 300 refines scripts and the content module 302 is configured to integrate agent content into the fixed content. Fixed content may include product, survey, marketing, or other information important to the user. It is the user-defined content that provides information and solicits information. Fixed content may include all content that is not ad lib, or interjection. It will be appreciated by those of skill in the art the term fixed does not mean permanent or incapable of modification or change. As the agent presents the script segments, the content module 302 is configured to modify at least one script or script segment to incorporate the content and sequence of agent content recorded by the recording module 306 discussed in further detail below.

The script formulation apparatus 300 also includes an interaction module 304 for allowing agents to present the scripts to a contact and to freely interject agent content into the script presentation. Agent content may be any content provided by an agent, whether by prerecorded script or by live voice interjection. In one embodiment, a user provides a script to its best sales agent. When this sales agent presents the script to a contact, he or she will use learned sales techniques. The agent may interject into the script or sequence of scripts conversation or banter that will establish a relationship with the contact. For example, the agent may solicit a name or title such as "Mrs. or "Doctor" and use that name or title whenever he or she refers to the contact in the future. This establishes a rapport that helps make a sale. The agent may also play scripts in a particular sequence in order to achieve better results with the call.

The script formulation module 300 may include a recording module 306 for observing and recording the presentation of scripts and agent interjections. In this way, the system can capture sales or other techniques utilized by the agent and incorporate them into the script for future playing. For example, it may be observed that the best sales agents solicit a name or title early in the call so that they can use it throughout the call. It may be that the best agents always interject with an interjection at a particular point in the script. This may indicate that the script is flawed or confusing at that particular point. The agent may give a courtesy laugh at a particular point to help build rapport. These interjections can be scripted and the sequence matched so that the playing of the overall script or sequence of scripts can mirror the way the best sales person uses it. The script can be modified and provided again to an agent by the content module 302 to replay and further improve the quality and personalized nature of each script or sequence of scripts. Thus, agents, regardless of their skill level, can present scripted calling campaigns and appear to the contact to be the best sales agent.

The recording module also records each question asked by the contact such that the answer to the question can be incorporated into the overall script or into some script segment prior to the time contacts typically ask the question. In one embodiment, the script options contain an answer to the question at the point where the question is most likely to be asked.

The script formulation apparatus 300 includes a structure module 308 for providing a profile structure based upon the presentation of scripts and agent interjections. By observing and recording, or making a record of, how an agent presents a sequence of scripts, contact specific information utilized by the agent can be determined. For example, a good agent may use a person's name or title. The agent may restate a question or attempt to close a deal in a different fashion instead of accepting the first "no" he or she hears. A good agent may recognize prior affirmations to let the contact know the agent is listening. For example, a contact may have already stated that they can't afford a product. A good agent may recognize this prior affirmation when making additional attempts to sell a product. The agent may say, for example, "I know you say money is tight right now, but there are ways in which we can get this product in your hands." By identifying, remembering, and restating a contact's earlier statements, the agent builds rapport and is more likely to be effective during a call. The structure module 308 provides categories, conditions, statuses, and information areas where contact-specific information can be recorded for use by the agent later in the script presentation.

The script formulation apparatus 300 includes an output module 310 for outputting a dynamic script structure comprising a sequence and content of information to be presented in the scripts. The scripts may be structured to solicit a name or title right after an introduction if that proved most effective during the agent interaction. The output module 310 may structure a script sequence to provide the agent with a laugh option when a particular script is played. The output module 310 determines how long each script segment may be and the specific content of each script. The output module 310 determines when each script is played and the possible follow up scripts for each script played. The output module 310 determines the content of repeat scripts so that scripts are not repeated exactly as they were first presented. The output module 310 determines the content of interjections and when they are to be presented to the agent. The output module 310 determines predetermined user content, or in other words fixed content, customer-specific content, and ad-lib or interjection content and when each can be played. The output module 310 may also provide the content module with a structured script presentation to be replayed or presented again to a contact by an agent to further refine the scripts.

The script formulation module 300 may also include an analysis module 312 to determine the frequency and sequence of scripts presented by the agent to a contact to modify the content and sequence of scripts to be presented by the agent. As discussed above, repeated interjection scripts played by one or more agents at the same location in the sequence of scripts may signal a problem with the script played just previous to the interjection.

Figure 4:
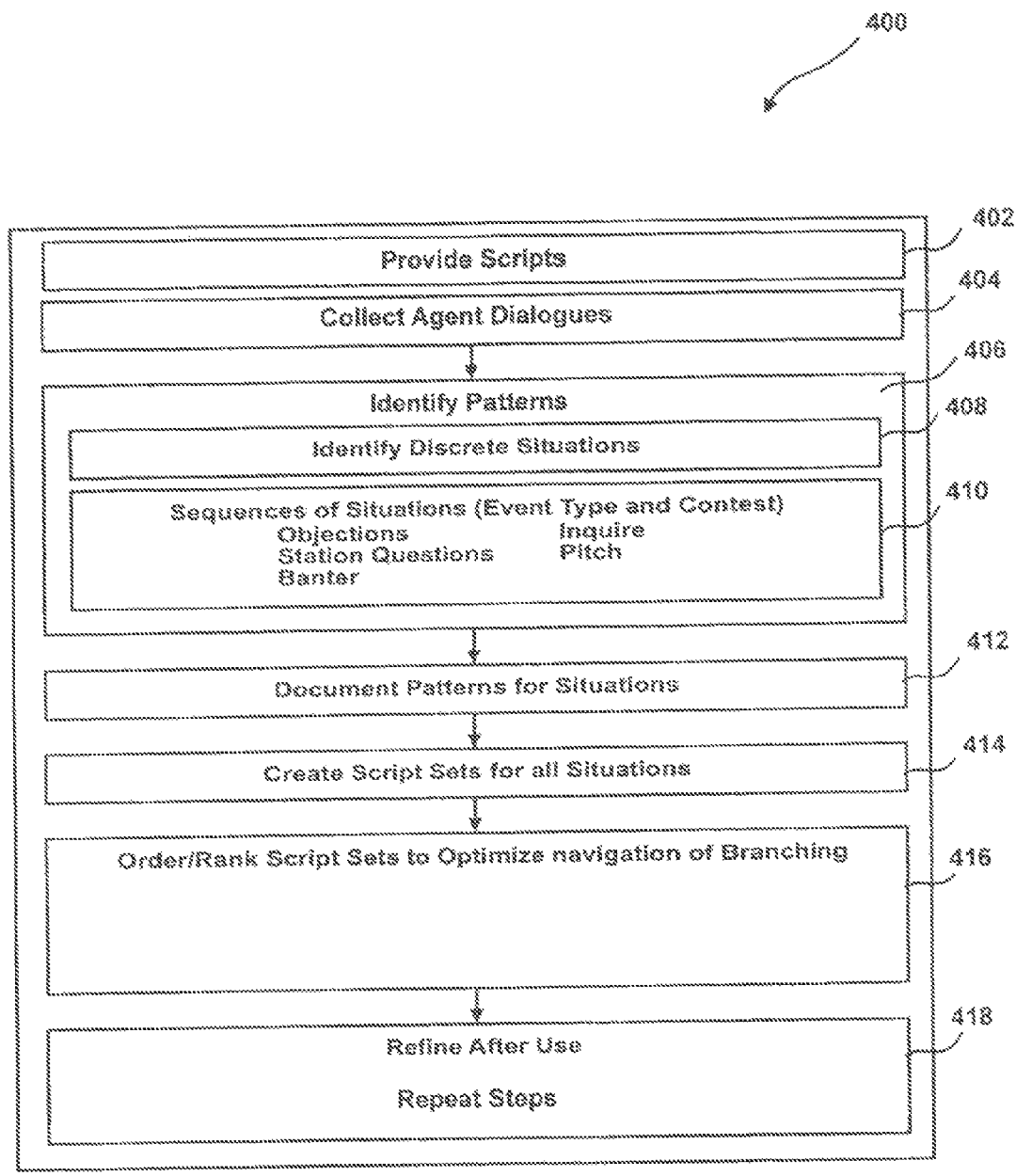
FIG. 4 is a schematic block diagram illustrating one embodiment of a method of formulating a script that may be implemented on the script presentation system of FIG. 2.

FIG. 4 depicts a block diagram illustrating one embodiment of a method 400 of formulating a computerized presentation of a sequence of scripts that includes fixed content, customer-dependent content, and agent content. The method 400 includes providing 402 scripts having fixed or predetermined content. Agents are provided and allowed to control the presentation of the scripts. In one embodiment, a user's best agents are utilized, corresponding to criteria reflecting comparatively greater effectiveness in making presentations to prospective customers. The agents are allowed to interject into the presentation of the scripts with agent content. The agent content may be ad lib content or other types of interjections.

The method 400 includes the step of observing the agents during presentation to prospective customers and recording the execution of the script segments and interjection of agent content as presented at the discretion of the agent. The agent dialogues are collected 404 and analyzed. In one embodiment, the method applies statistical analysis to determine the frequency and sequence of execution of script segments in order to determine which script segments to present to the agent as choices for execution.

The method provides a profiling structure based upon sequencing and content of the pre-determined content, customer-dependent content and ad lib content. In one embodiment, the profile structure is provided by identifying 406 patterns in the presentation of the script by the agent. The method 400 may identify 408 discrete situations where, for example, personalization or rapport building can take place. There may be discrete situations where sales techniques may be employed. When these situations or occurrences in the script sequence are noted, scripts can be tailored to capture the sales technique or utilization of contact-specific information. The method 400 may also identify 410 sequences where objections or questions often arise, or where the agent uses banter or a different voice pitch in the presentation of the script.

The agents live interjection and interaction with the contact via the presentation of scripts and use of live voice can be captured or documented 412 and scripted 414 such that every agent may use the techniques of the most effective agents. The method 400 then provides a dynamic script structure comprising a sequence and content of information to be presented in script segments and ad lib presentations, based upon sequencing and content of the pre-determined content, customer-dependent content, and ad lib content. For example, the scripts can be ordered 416 to optimize navigation or branching of the scripts. The script structure can also help minimize agent choices. The method 400 can then be refined 418 by repeating the process. The scripts are modified to incorporate the content and sequences of agent content observed. In one embodiment, the method is iterated and agent content, such as ad-lib interjections, are migrated or added to the fixed content scripts or script segments. For example, an agent may present modified scripts and the presentation and agent interjections may again be recorded and analyzed to find ways to improve the script content and script sequencing. The method 400 can also be used to insert test questions to elicit a response and then track the result of the question.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
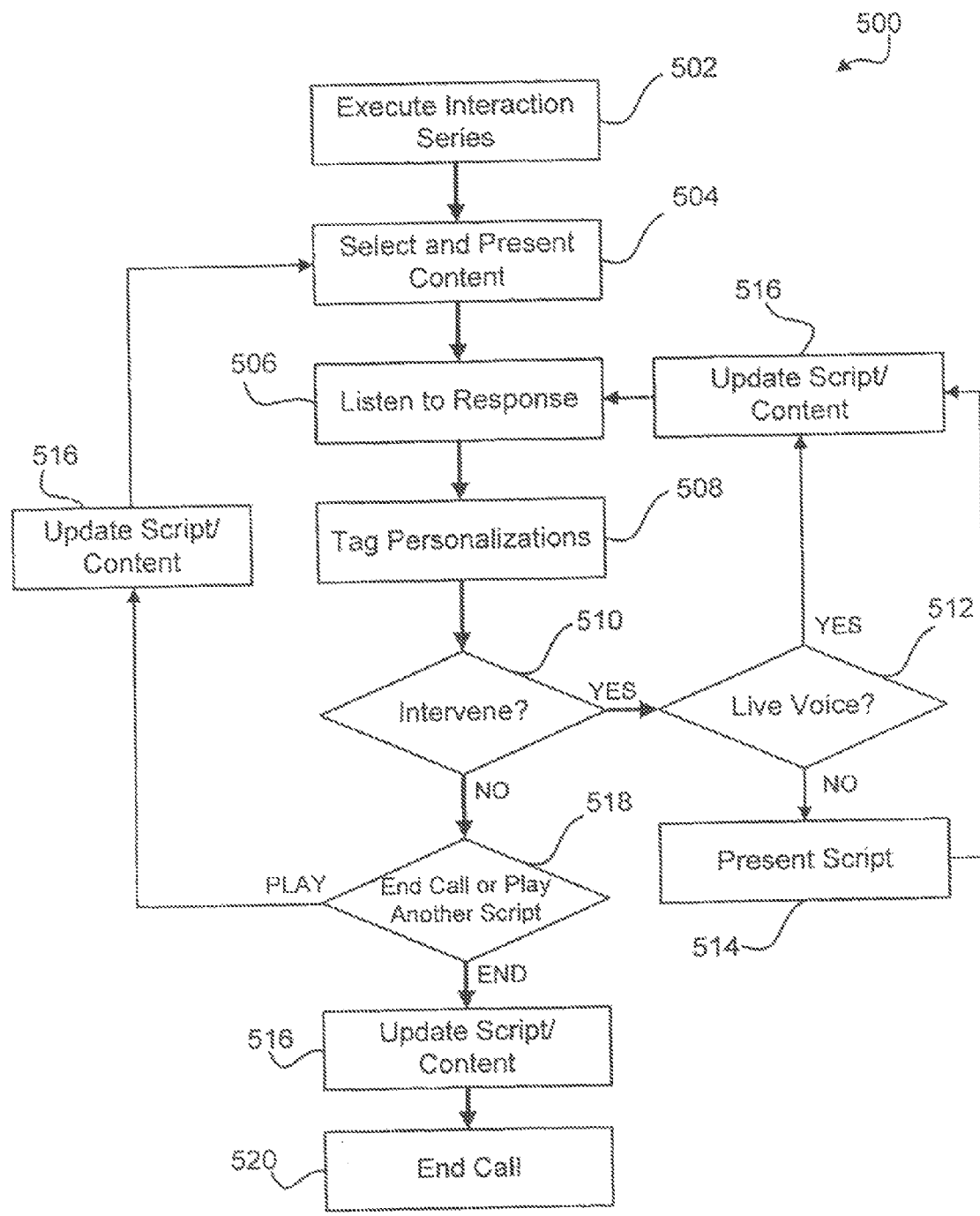
FIG. 5 is a schematic flow chart diagram illustrating one embodiment of a method for presenting scripts that may be implemented on the call disposition system of FIG. 2.

FIG. 5 depicts a flow chart 500 of one embodiment of formulating a sequence of scripts. An interaction series may be executed 502. Script content may then be selected and presented 504 to a contact. The agent the listens 506 to a response from the contact. Any personalizations or opportunities to customize the script to refer to the contact's status, situation, or circumstance is tagged or identified 508 to create a profile structure. The agent decides 510 whether to intervene or interject. If the agent decides to intervene, the agent decides 512 to use live voice or script. If the agent decides to present intervene by playing a interjection script, the script is presented 514. The agent may also interject with a questions or statement in live voice. The script is updated 516 to fixed any problem that necessitated the intervention 510 or to reflect any information gleaned during the interjection. If there is no intervention, a determination is made 518 to end 520 the call or play another script. In either event, the script content may be updated.

A signal bearing medium is also presented to store a program that, when executed, performs one or more operations to formulate a computerized presentation of a sequence of scripts. In one embodiment, the operations include formulating a script by performing the method steps outlined above.

Figure 6:
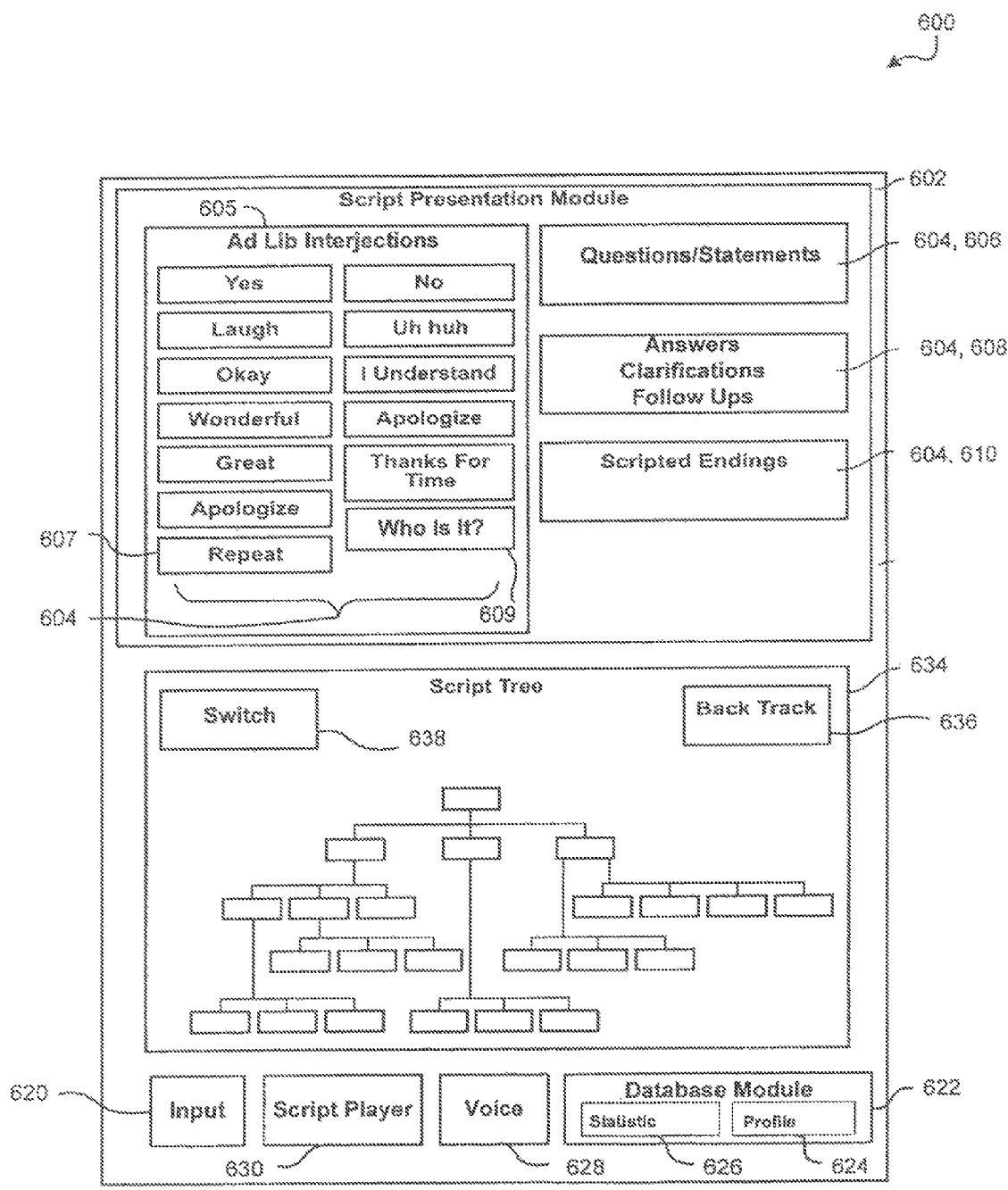
FIG. 6 is a schematic block diagram illustrating one embodiment of a script presentation apparatus in accordance with the present invention.

FIG. 6 depicts a block diagram of a script presentation apparatus 600 in accordance with the teachings of the present invention. As discussed above in conjunction with the system, the script presentation apparatus can be part of the system or a stand-alone apparatus. In either configuration, the script presentation apparatus 600 or module 215 functions in substantially the same way to present scripts to a contact.

The script presentation apparatus may include a script player 630. The script player 630 may include hardware, firmware, data structures, and/or software in the form of a script player module 630. The scripts may be in the form of audio files.

In one embodiment, the script player 630 plays audio files automatically or in response to an input from the agent. The script player may access memory in the calling system to obtain the audio files stored there. It may play the audio file over the phone system to the contact. The script player 630 may be programmed to sequence various audio files, stop the playing of the audio files, and start the playing of the audio files.

The script presentation module or apparatus 600 may contain a presentation module 602 for presenting a plurality of script options 604 to an agent. These options 604 may be associated with designated buttons, screen areas, or other input devices to deal with situations such a hang up, a recording, or an unexpected answer to a scripted question previously played.

The options 604 may include a variety of scripts 606 to be played to provide information or request information. For example the scripts 604, 606 may be the fixed, or predetermined user content used to conduct a sales campaign, telemarketing study, survey, and the like. The options 604 also include scripts 608 for providing answers, clarifications, follow up questions, and the like. These options 604 may include options 604, 608 to repeat a script. The options 604 may include ad lib interjection scripts 605 to enhance conversation such as a "laugh" or an "uh huh." The options 604 may also include scripts to be played in conjunction with various types of call transfers or closings 604, 610. The options 604 may also allow an agent to play interjection scripts. It will be appreciated that the number and variation of scripts and script options that could be utilized is limitless and that only a representative sample has been discussed.

The presentation apparatus 600 also includes an input module 620 for receiving agent inputs. An agent input may include an electronic signal for a keyboard, touch screen, microphone, and the like. In one embodiment, each input corresponds to a script option 604. An agent may provide an input by touching a screen where the script option 604 is presented. An agent may also provide an input using a voice command, keystroke, or similar action associated with a particular script option 604.

The agent input may launch executables programmed to carry out a variety of commands, including, but not limited to, playing a script, executing a hang up sequence, executing a call transfer sequence, updating a database, storing a response, outputting data or a report, and the like.

For example, it is often the case that a contact called may not have understood an opening line introduction played by the dialer (FIG. 2). The contact may say, "Excuse me?" The agent could provide an input by pressing a "repeat" script option 604, 607 on a screen or viewer. Touching this script option 604 may launch an executable that replays the introduction or a variation of the introduction to the caller. If the contact asks "who's calling?" or "who is this please?" the agent provide an input by pressing a "who is it" script option 604, 609 button that would play a script that responds appropriately. If the contact says "you've got the wrong number," the agent may utilize a "wrong number" script option (not shown), which in one embodiment plays an appropriate apology, initiates a hang up sequence, and updates a database to reflect this information. If the contact wants to be called back later, the agent may provide an input by pressing a "call back message" button (not shown) may play an appropriate script that agrees to do that and politely ends the call. The database may then automatically updated to reflect this information upon the pressing of this button. It will be appreciated by those of skill in the art that inputs could be provided in a variety of ways, including without limitation, touches, keystrokes and voice commands.

An agent uses the presentation 602 and input 620 modules interact with, or carry on a dialogue with, a contact by playing scripts, listening to a contact's response to the script, and providing another input to play additional scripts corresponding to the contact's responses. In one embodiment, scripts provide information to a contact and then end with a question. The questions are well crafted to solicit information through a finite number of possible answers. By presenting closed-ended questions, the contact's response can be anticipated and input options associated with the contact's possible response can be presented (see FIG. 9) to an agent to initiate a next script.

The presentation module 215 includes a database module 622 that includes a profile module 624 for storing contact-specific data. This data may include without limitation, a marital status, a number of children, family relationships, business relationships, titles, customer technology, attitudes, dispositions, prior affirmations, socioeconomic factors, purchasing patterns, and the like. It will be appreciated that any information that could be associated with a particular contact may stored in the profile module 624. As scripts are played and contacts respond, they provide information, either knowingly or unknowingly, about themselves. When information is provided by someone during a regular conversation, people involved in the conversation note it later in the conversation. Similarly, the profile module 624 allows the script or sequence of scripts to be personalized by using contact-specific information instead of generic information. Profile information may be stored in the database module 622.

In one embodiment, the apparatus 600 includes a voice module 628 to allow an agent to switch off, pause, or otherwise stop playing scripts and use live voice. This may be necessary when a contact gives a response for which there is no appropriate comeback script or if there is a problem with the script player. The voice module 628 and input module 620 allow an agent to selectively and seamlessly interleave voice and computer-played scripts.

A navigation module 634 allows an agent to backtrack 636 and view script options corresponding to a previously played script. The navigation module 634 may also allow the agent to switch 638 from a present set of script options to different set of script options. In one embodiment, the presentation module 602 presents navigation options to accomplish maneuvering between different script options or to backtrack or relocate to different part of the overall sequence of scripts.

The script presentation apparatus 600 of the system 200 may also include a statistics module 626 for keeping statistical data regarding agent inputs. The statistics module 626 may record which call interaction options were played by an agent at any time during a call. The statistics module 626 also keeps track of where the agent interjects into the script or sequence of scripts. The statistics module 626 also keeps track of the time it takes an agent to provide an input. In one embodiment, this is accomplished by tracking the date stamp of every agent input. This allows a user to identify problems in the script or with the agent using the system. The statistics module 626 may also determine which responses are most likely to be given by a customer in response to a script played by the agent. Thus, the options for a counter response script to be played by the agent can be limited based on statistical probabilities. This allows for less material on the screen for the agent to scan and assimilate. It will be appreciated that when the statistics module 626, in conjunction with the presentation module 602, presents only those script options 604 that have a high probability of being used, a viewer or screen used to present options to the agent is less cluttered, which increases agent reaction and input times. The statistics module 626 provides statistical analysis and may update information regarding calls and customers to the database module 622.

The database module 622 may include standardized database products known in the industry including products by Sybase®, or Oracle®, Access®, or plain text databases. The database may structure data or records according to a schema and allow access to the data. The database may work with or be part of the statistics module 626 and profile module 624 to facilitate tracking all aspects of a call. In one embodiment, the statistics module 626 interacts with the database by sending commands or requests for data records. The statistics module 626 may search, sort, filter, and modify data records in the database.

The statistics module 626 may also contain a report module (not shown) for compiling and outputting various reports. In one embodiment, the statistics module 626, and/or the profile module 624, is configured to output data regarding contact information obtained during a call. This allows a user to track contact information and conduct an automatic survey regarding information of interest to a user. This allows a user to know, for every contact called during a calling campaign, who, for example, has kids, is retired, watches more than 5 movies a month, spends more than $20.00 a month on direct marketing items, and the like. In this manner, surveys can be conducted in a conversational manner, or as part of a sales call, without the contact knowing that a survey is taking place.

In one embodiment, the statistics module 626 determines, based on input from the agent during a script presentation exchange, all of the people called who have the Internet. Then the user company can, at a later time, call all those people that have the Internet to sell Internet-related products.

The data output by the profile module 624 may also be used when transferring a call to a sales agent or customer service agent so that the agent to whom the call is transferred has updated or current information regarding the contact on the other end of the line. In one embodiment, the data is automatically presented to the screen of the agent receiving the transfer.

Figure 7:
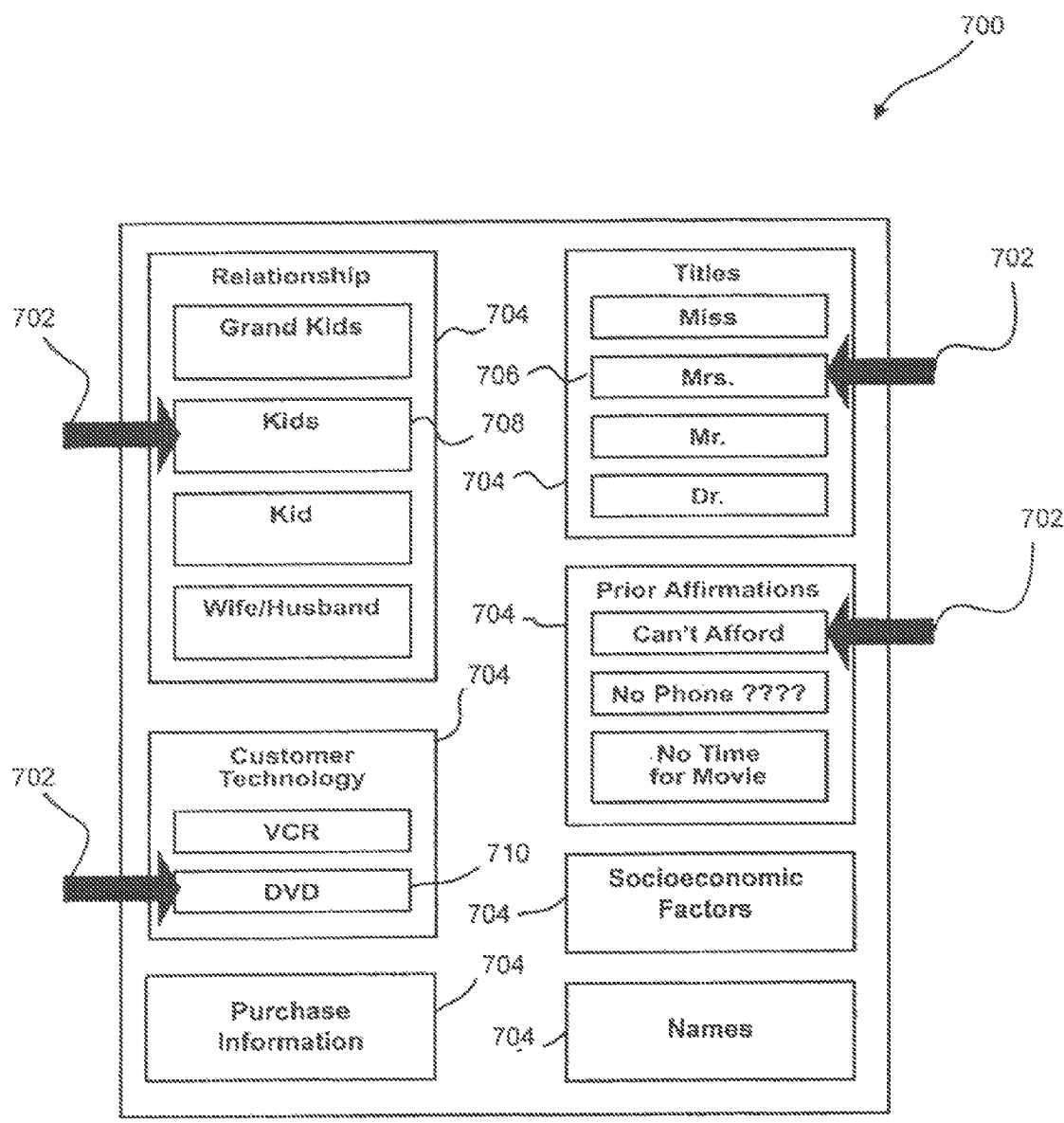
FIG. 7 is a block diagram illustrating one embodiment of a profile module that may be implemented on the script presentation system of FIG. 2.

FIG. 7 is a block diagram illustrating one embodiment of a profile structure 700 used in conjunction with a profile module 624 in accordance with the present invention. The input module 620 of FIG. 6 is configured or programmed to provide at least one pointer 702 to data 704 in the profile 700. The pointer 702 may be any indicator, including without limitation, a memory location, a bit, a byte, an address, a tag, a highlight, and the like. The profile structure may be in a database configured to store preselected fields of information. The profile structure may be a collection of data structures stored in memory.

The profile structure 700 allows a database or memory to store a customer profile that is updated as the call progresses. Information in the profile can then be retrieved from memory to play scripts that are personalized to the customer. In one embodiment, the profile structure uses pointers to identify the class or group of contacts based on the profile structure or pre-determined parameters and play scripts reflecting the class or group of contact. For example, early in the call, it may be determined that the contact is a married female. The pointer 702 would then point to all the scripts having a female gender component 706 such as "Mrs.", "mam", and the like. In answer or response to a script played by the caller, it may be determined that the contact has two or more children. A pointer would then point to the scripts that reference a married female gender component and a parent of multiple kids component 708. Subsequent scripts could be played to elicit more information about the caller and the field of possible scripts could be further narrowed to reflect for example, a female head of house hold with multiple children that owns a DVD player 710.

When a sequence of scripts representing a user's marketing campaign, the scripts in the campaign would reflect the personalization information indicated by the pointer 702 instead of just playing generic scripts that are less natural sounding, and that can tip off the customer that it is interacting with a computer. As an agent interacts with a contact, the agent may become aware that one aspect of the personalized information is incorrect. The presentation module (FIG. 6) allows the agent to update the pointer to point to the correct personalized information. It will be appreciated that any number of pointers may be utilized to identify any kind of personalized information.

Figure 8:
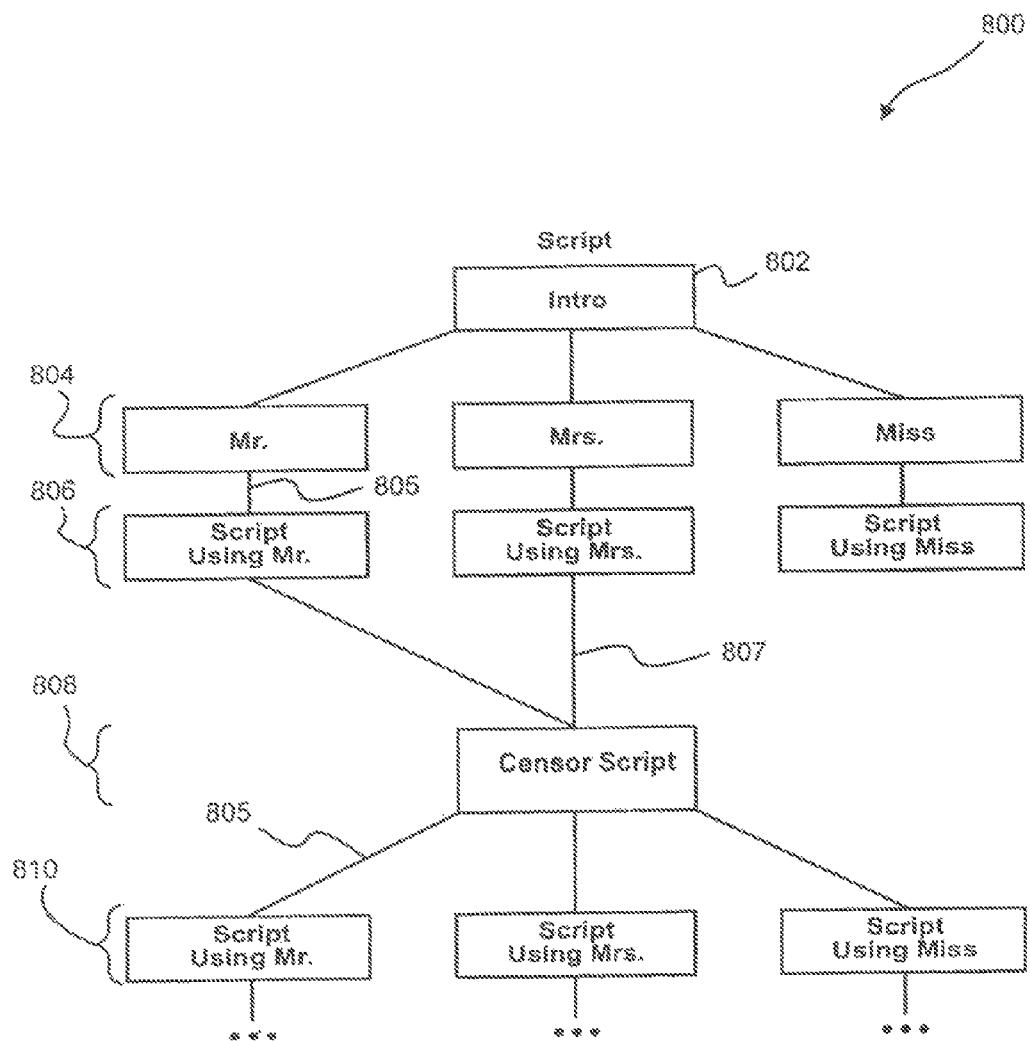
FIG. 8 is a schematic block diagram illustrating one embodiment of a method of presenting scripts that may be implemented on the script presentation system of FIG. 2.

Referring now to FIG. 8, a flow diagram 800 representing one embodiment of the present invention for using the pointers of FIG. 7. In one embodiment, an opening introduction 802 may be played. The introduction may include a question that allows the agent to determine 804 the gender and/or marital status of the contact. This information is stored by the profile module. In one embodiment, a pointer to the appropriate personalized information category in the profile structure may indicate the newly determined information. A next script 806 may be able to incorporate this information, thus making the scripted dialogue seem natural and unscripted. A next script 808 may be a generic informative script that does not need to, or cannot adequately, utilize any personal information stored in the profile. A next script 810, however, may again be able to utilize the gender/marital status information gleaned earlier in the call. Because in one embodiment, a pointer still points to this information, this next script 810 is also more personalized.

It will be appreciated by those of skill in the art that there are a variety of ways to save and reuse contact information gleaned from the interaction of an agent with a contact. In one embodiment, for example, the pointer is simply a saved response from earlier in the presentation of script segments. When the script can play personalized information, the script branches to an alternative path and plays a script segment, or portion of the script the contains the personalized information. Whenever, personalized information can be played, a branching occurs. When there is a portion of the script that does not require personalization, the script may return to the original branch. Using FIG. 8 as an example, the introduction 802 may contain a question regarding the gender of the contact. When the contact responds that they are a male, the agent may press a "Mr." button 804 to save this response. The "Mr." button may play the next script segment 806 in the overall script which is on a "Mr." branch 805. The next input given by the agent may play a script segment 808 regarding censorship that does not require any personalized information from the profile. Accordingly, the next script segment may be back on a main branch 807 of the overall script. The response given by the contact to this script segment may trigger an input from the agent that again plays a next script 808 that can be personalized using the "male" information in the profile that from an earlier saved response. The overall script would then be back on the "Mr." branch 805. It will be appreciated by those of skill in the art that a overall script can contain a main path or branch 807, and several alternate paths that can be triggered by pointers or similar indicators. The branching to alternative paths may be represented by script options provided to the agent based upon pointers in the profile.

Figure 9:
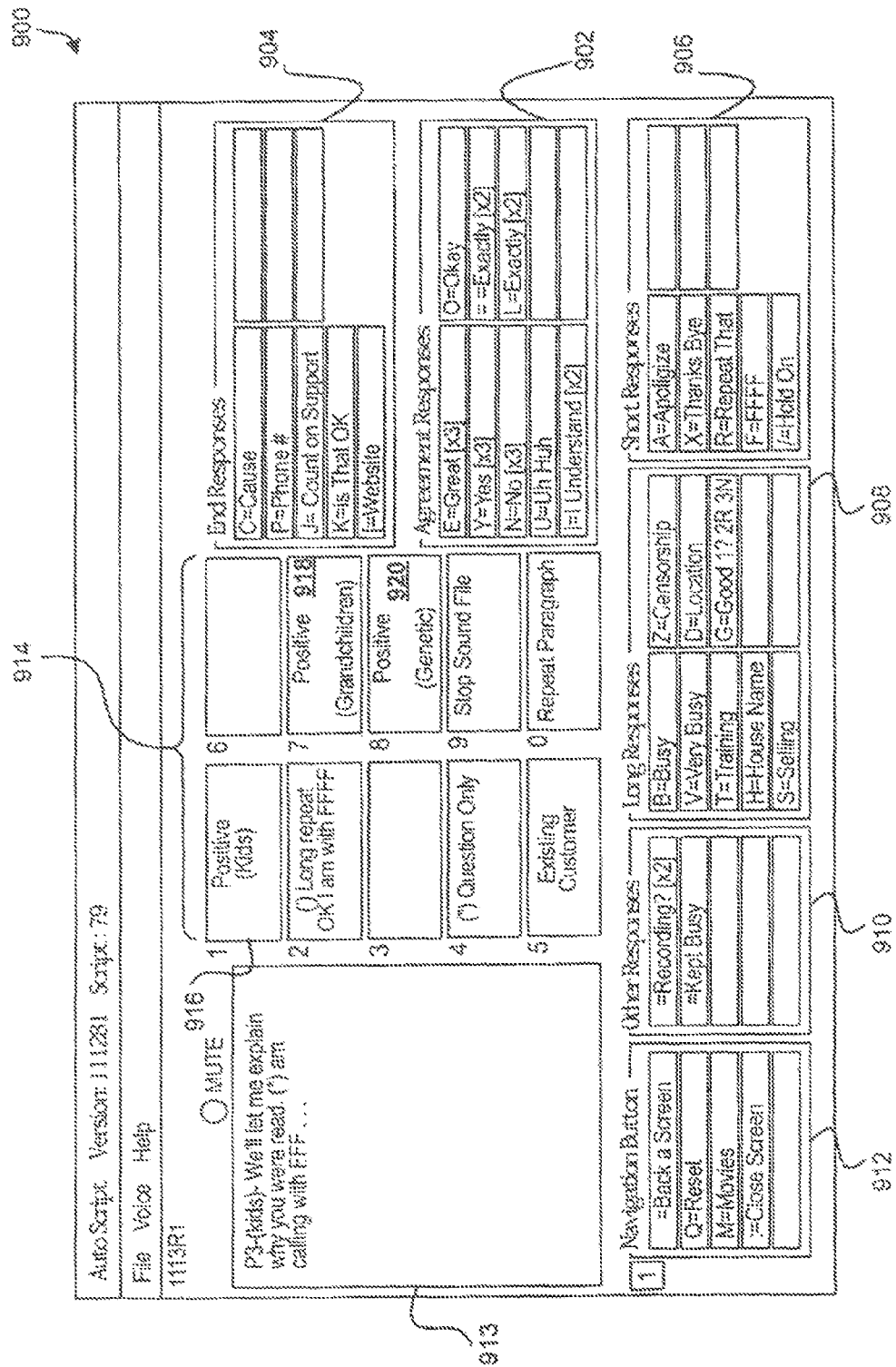
FIG. 9 is a schematic block diagram of a script option presentation to an agent in accordance with the present invention.

FIG. 9 illustrates a presentation 900 by the presentation module 602 (FIG. 6) in accordance with the present invention. A viewer or monitor may show scripted interjection responses, which are standard in general conversations, such as agreement responses 902 or other short responses 906. The view may present long responses 908 to questions that are often asked by a contact. Other disposition type responses 910 may also be presented along with navigational buttons 912. A script area 913 may display the script, or a representative portion, that is currently being played. The viewer also illustrates anticipated responses 914 to the script being played. Thus, in one embodiment, the presentation module is configured to display at least one script option 916 reflecting a response from a contact. When an option is selected by an agent, the input module is configured to provide a digital input to the processor to execute a command to play the associated script.

At least one script option 916 reflects facts corresponding to a circumstance of the contact. The presentation module is configured to present script options 914 to the agent based upon the profile for outputting contact-specific scripts. For example, option 916 is an option that references multiple kids in the script to be played if that option 916 is selected because earlier in the call, the agent confirmed that the contact had multiple kids. A pointer was attached to the "kids" category in the contact profile. Accordingly, whenever a script is played that reference a child, the more contact-specific "kids" will be played. Accordingly, the presentation module in this embodiment presents at least one script option showing data associated with at least one pointer. The presentation module is also configured to present a sequence of script options based upon data associated with at least one pointer. For example, after the pointer to "kids" was established, the script sequence may switch to the "kids" track of branch of the overall sequence of scripts.

The script presentation system may also determine where the customer is most likely to correct the information stored in the profile. The system may give the agent the chance update, correct, or modify the profile at that point. For example, based on observance of the dialog being played by the agent, or based on statistics or other means, after the playing of a particular script, the contact may say, "actually, I=m the grandmother, @ or AI=ve never owned a DVD player.@ Because the apparatus can determine when these types of corrections are most likely to be played, the system can give the agent the option to play a clarifying script while updating the profile.

In the embodiment illustrated in FIG. 9, script option 918 provides an option to respond to a contact who may state that they have grandkids, not kids. By pressing this option 918, an agent may modify or correct the incorrect profile and the input module reassigns the pointer in response to the agent's input. Script option 920 provides an option to respond to a contact who may clarify, or suggest, that in fact they don't have multiple kids. By pressing this option, the pointer is turned off and generic child content is used in the scripts.

As stated above, a method for presenting a plurality of audio files to a contact, includes calling a phone number corresponding to a contact. The call is initiated to play a sequence of scripts that may represent a sales pitch, a marketing campaign, a survey, an information broadcast, and the like. A plurality of audio files representing the script are stored and a selection of script options corresponding to the audio files presented to the agent. An input to control the playing of the audio files is received from the agent. The input may include an electronic signal sent to the central processing unit to execute the playing of a script. The input reflects a response received from the contact. A profile is stored to reflect data corresponding to the response of the contact. The agent can then selectively play a plurality of audio files, customized to reflect the profile.

At least one script option reflects data in the profile obtained from the contact during a call. In one embodiment, receiving an agent input includes automatically updating data in the profile. It may also include providing at least one pointer to data in the profile. Script options may be presented based upon a statistical analysis of agent inputs. Script options may also reflect responses given by the contact. In one embodiment, at least one script option is presented that includes data associated with at least one pointer. Additionally, presenting a selection of script options includes presenting a sequence of script options based upon data associated with at least one pointer. Pointers may be reassigned in response to receiving an agent input. Receiving an input includes modifying the profile in response to an agent input.

A signal bearing medium is also presented to store a program that, when executed, performs one or more operations to present scripts to a contact. In one embodiment, the operations include presenting a script by performing the method steps outlined above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for presenting a plurality of prerecorded scripts to a contact during a call, the system comprising:
    a dialer configured to connect to a phone system;
    a controller coupled to the dialer for managing the initiation of calls to a contact;
    Input/Output (I/O) devices configured to interact with a user;
    a memory containing modules for execution on a processor, the modules comprising:
        a script player module for playing a plurality of scripts, each script comprising a prerecorded audio file;
        a presentation module for presenting a plurality of script options to a human agent;
        an input module for receiving multiple inputs from the human agent, each input corresponding to one or more of said plurality of script options, at least one agent input corresponding to an executable file for playing a script;
        a profile module for storing a contact profile reflecting contact-specific data; and
        wherein at least one script option comprises contact-specific data received during the call and reflected in the profile module to allow the agent to play a script that is specific to the contact being called, said contact-specific data comprising at least one data type chosen from a marital status, a family status, a business status, a relationship status, a title, a customer technology, an attitude, a disposition, a prior affirmation, a socioeconomic factor, and a purchasing pattern; and,
    a communication network coupling the dialer, controller, processor, I/O devices, and memory.

2. The system of claim 1, wherein the memory further comprises a script formulation module to formulate scripts.

3. The system of claim 1, wherein the memory further comprises a statistics module for keeping statistical data regarding agent inputs.

* * * * *